3,639,632
ANTIMICROBIAL COMPOSITIONS CONTAINING 1,1'-HEXAMETHYLENEBIS [5-(2 - ETHYLHEXYL) BIGUANIDE] DIHYDROCHLORIDE AND 4-CHLORO-2-HYDROXYPHENYL 2,4 - DICHLOROPHENYL ETHER

Thomas F. McNamara, North Caldwell, and Meyer Malakoff, Dover, N.J., assignors to Warner-Lambert Company
No Drawing. Filed June 22, 1970, Ser. No. 48,552
Int. Cl. A61k 27/00
U.S. Cl. 424—326                                  2 Claims

ABSTRACT OF THE DISCLOSURE

A synergistic antimicrobial composition containing 1,1'-hexamethylenebis [5 - (2-ethylhexyl)biguanide] dihydrochloride and 4-chloro-2-hydroxyphenyl, 2,4-dichlorophenyl ether. Such compositions are useful against bacteria, such as *Staphylococcus aureus*.

---

The present invention relates to a novel antimicrobial composition comprising as active ingredients 1,1'-hexamethylene-bis[5 - (2-ethylhexyl)biguanide] dihydrochloride at a concentration of 0.02 mg. percent and 4-chloro-2-hydroxyphenyl 2,4 - dichlorophenyl ether at a concentration of 0.025 mg. percent in an inert pharmaceutical carrier.

Chemically, 1,1' - hexamethylenebis [5-(2-ethylhexyl) biguanide] dihydrochloride has the following structural formula:

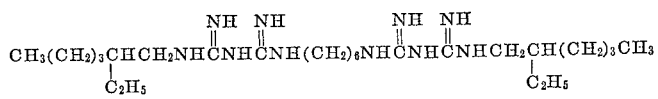

This compound is available commercially from Sterling Chemicals, Inc.

4-chloro-2 - hydroxyphenyl 2,4 - dichlorophenyl ether has the following structural formula:

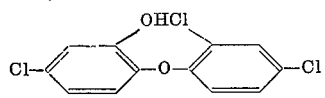

and is available from Geigy Pharmaceutical Company.

These compounds have been found to possess antimicrobial activity typically against gram positive organisms such as, for example, *S. aureus* and gram negative organisms such as, for example, *E. coli*.

It has been found that the very desirable antimicrobial activity of these compounds can be further improved synergistically if they are combined in a ratio of about 0.02 mg. percent to about 0.025 mg. percent. Thus, in testing such a combinaton, they are effective in inhibiting the growth of various strains of *Staphylococcus aureus* at 0.045 mg. percent. This is surprising, since the respective components, namely, 1,1'-hexamethylene-bis [5-(2-ethylhexyl)biguanide] dihydrochloride and 4-chloro-2-hydroxyphenyl 2,4 - dichlorophenyl ether exhibit minimum inhibitory concentration of 0.07 mg. percent and 0.2 mg. percent, respectively, against the same organisms.

The discovery of this unexpected synergism in such a combination is not only useful, but its application in antimicrobial theraphy is highly significant since it enables quantities of these ingredients to be used at very low concentration to produce the desired antimicrobial effect.

According to the present invention, there are provided novel and physiologically acceptable pharmaceutical compositions for the treatment and prophylaxis of bacterial infections which compositions are particularly effective against organisms commonly found in the oral cavity and axilla. These compositions comprise as active ingredients one or more compounds corresponding to the above formula in combination with nontoxic pharmaceutical excipients which compositions optionally contain also other known antimicrobial agents. These include compostions for oral or for local applications. The compositions of the invention for oral use comprise the stated active ingredients and such standard pharmaceutical excipients as are commonly used in the manufacture of oral dosage forms for human and veterinary medication. They include, for example, mouth washes, tablets, syrups, elixirs, and the like. Liquid formulations are most convenient because of the fact that the active ingredients is normally liquid. Generally the compositions are so formulated that the active compounds are employed in the ratio described in the selected pharmaceutical excipient or combination of excipients. For local applications these compositions may include, for example, the active ingredients in such standard excipients as are commonly used in the manufacturing of topical dosage forms such as creams, ointments, dusting powders, aerosols, etc. For example, such excipients may include petrolatum, talc, lower alcohols and the like. Such compositions are particularly useful in treating local bacterial infections or where prophylactic treatment is desired. The above compositions may also contain other known antibacterial agents such as, for example, the penicillins, tetracycline, the sulfonamides and the like. They may also include flavoring, coloring and surface agents. The compositions of the invention may also contain other known therapeutic agents such as, for example, antiprotazoal, antipruritic agents, anti-inflammatory as well as antihistamine agent.

The following examples are included in order to further illustrate the invention.

EXAMPLE 1

The synergistic effectiveness of these two compounds, 1,1'-hexamethylenebis [5-(2-ethylhexyl)biguanide] dihydrochloride and 4-chloro-2-hydroxyphenyl 2,4-dichlorophenyl ether against *S. aureus* is demonstrated in the following two tests known in the art as the Kahn method:

Two racks of 20 sterile Kahn tubes containing 1 cc. of brain heart infusion (Difco) broth having a pH of 7.2 are employed. The reference compound employed is hexetidine trihydrochloride. A 0.1% solution of the above compound is added to the first tube in each row and serially diluted 2-fold through the 9th tube. The 10th tube contains broth only and is the control. The same procedure is followed for the reference compound. Each tube is then inoculated with 0.1 ml. of 1:100 dilution of an 18 hour tryptose phosphate broth culture of *Staphylococcus aureus* M 250 making the final volume in each tube 1.1 ml. After thoroughly mixing the tube contents, the tubes are incubated for 48 hours at 37° C. Tubes are then read macroscopically for presence or absence of visible growth and results are reported as minimum inhibitory concentration (mg. percent) test compound required to kill the test organism.

The combination has been found to have a minimum inhibitory concentration of about 0.045 mg. percent against *S. aureus*. Similarly, using the aforesaid procedures, 1,1'-hexamethylenebis [5-(2-ethylhexyl)biguanide] dihydrochloride is also tested and its MIC is found to be 0.07 mg. percent.

Similarly using the aforesaid procedure, 4-chloro-2-hydroxyphenyl 2,4-dichlorophenyl ether is also tested and its MIC is found to be 0.2 mg. percent.

EXAMPLE 2

Oral antiseptic is prepared from the following:

1,1'-hexamethylenebis [5-(2-ethylhexyl) biguanide]— 0.02%
Dihydrochloride 4-chloro-2-hydroxyphenyl-2,4-dichlorophenyl ether—0.025%
Ethyl alcohol—1 ml.
Saccharin, sodium—11 mg.
Sodium cyclamate—110 mg.
Coloring matter—0.1 mg.
Purified water—to make 100 ml.

The above oral antiseptic contains 0.02% of 1,1'-hexamethylenebis [5-(2-ethylhexyl)biguanide] dihydrochloride and 0.025% of 4-chloro-2-hydroxyphenyl 2,4-dichlorophenyl ether and are useful as oral antiseptics for use as antiseptic mouth washes, a dose of 10 cc. is applied to the oral cavity as a gargle.

EXAMPLE 3

Similarly, the ingredients can be formulated into underarm deodorants or other topical formulations well known to the art.

We claim:
1. An antibacterial composition which comprises as active ingredients about 0.02 mg. percent 1,1'-hexamethylenebis [5-(2-ethylhexyl)biguanide] dihydrochloride and 0.025 mg. percent 4-chloro-2-hydroxyphenyl 2,4-dichlorophenyl ether in combination with an inert pharmaceutical diluent.

2. A method for treating susceptible bacterial infection in a human or animal which comprises administering orally or topically to said human or animal an antibacterial amount of a composition as defined in claim 1.

References Cited

UNITED STATES PATENTS

| | | | |
|---|---|---|---|
| 3,284,362 | 11/1966 | Zussman | 424—340 |
| 3,405,184 | 10/1968 | Widigev et al. | 424—340 |
| 3,445,398 | 5/1969 | Jungermann et al. | 424—340 |
| 3,468,898 | 9/1969 | Cutler et al. | 424—326 |

OTHER REFERENCES

Chemical abstracts 63:15407(g), (1965).

JEROME D. GOLDBERG, Primary Examiner

U.S. Cl. X.R.
424—340